(12) United States Patent
Dominguez

(10) Patent No.: US 7,051,392 B2
(45) Date of Patent: May 30, 2006

(54) HANDLE MULTI-PURPOSE TOOL

(75) Inventor: Armando Dominguez, 14445 SW. 95 Ter., Miami, FL (US) 33186

(73) Assignee: Armando Dominguez, Miami, FL (US)

( * ) Notice: Subject to any disclaimer, the term of this patent is extended or adjusted under 35 U.S.C. 154(b) by 163 days.

(21) Appl. No.: 10/697,134

(22) Filed: Oct. 30, 2003

(65) Prior Publication Data

US 2005/0091754 A1 May 5, 2005

(51) Int. Cl.
*B25F 1/02* (2006.01)

(52) U.S. Cl. .............................. 7/164; 81/439; 81/177.4
(58) Field of Classification Search ..................... 7/164, 7/165, 119; 81/437–439, 489, 490, 125, 451, 81/177.4
See application file for complete search history.

(56) References Cited

U.S. PATENT DOCUMENTS

| | | | | |
|---|---|---|---|---|
| 438,150 A | * | 10/1890 | Glover | 7/165 |
| 3,177,910 A | * | 4/1965 | daSilva | 81/177.2 |
| 3,816,864 A | * | 6/1974 | Cotter | 7/164 |
| 5,245,721 A | * | 9/1993 | Lowe et al. | 7/129 |
| 5,887,306 A | * | 3/1999 | Huang | 7/165 |
| 5,918,337 A | * | 7/1999 | Evling et al. | 7/108 |
| 5,974,916 A | * | 11/1999 | Lassiter | 81/121.1 |
| 6,029,549 A | * | 2/2000 | Baker | 81/439 |
| 6,098,226 A | * | 8/2000 | Lin | 7/165 |
| 6,164,172 A | * | 12/2000 | Huang | 81/490 |
| 6,243,902 B1 | * | 6/2001 | Huang | 7/165 |
| 6,374,711 B1 | * | 4/2002 | Anderson et al. | 81/490 |
| 6,405,396 B1 | * | 6/2002 | Tsai | 7/165 |
| 6,435,065 B1 | * | 8/2002 | Kozak et al. | 81/490 |
| 6,443,037 B1 | * | 9/2002 | Chang | 81/62 |
| 6,705,183 B1 | * | 3/2004 | Dickens | 81/437 |

* cited by examiner

*Primary Examiner*—David B. Thomas

(57) ABSTRACT

A handle multi-tool of particular utility to electricians for performing many operations involved in electrical installations in which a number of different tools are necessary, such as: pliers, channel locks, multi-tip screw driver, level, wire nut driver, scraper, measuring tape, calculator, level, and plum bob. All of them may be partially or totally replaced by this handle multi-tool, the shape and weight of which resembles a common screwdriver.

3 Claims, 8 Drawing Sheets

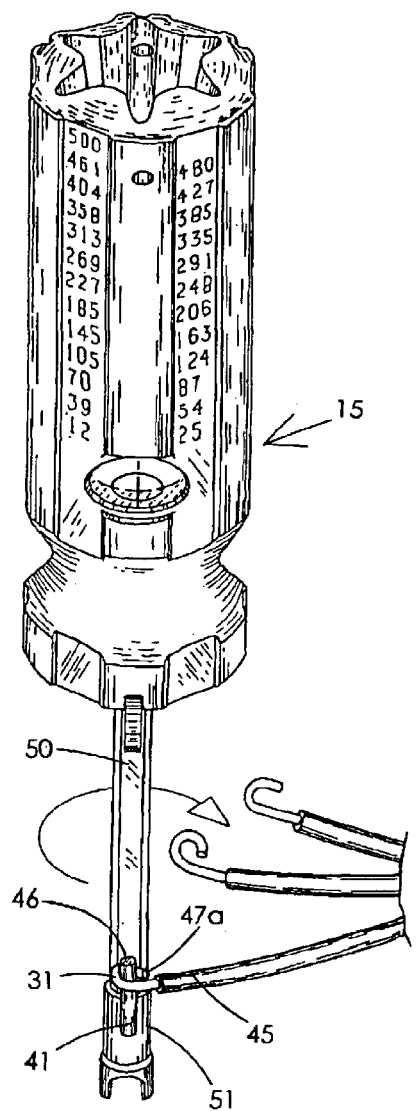
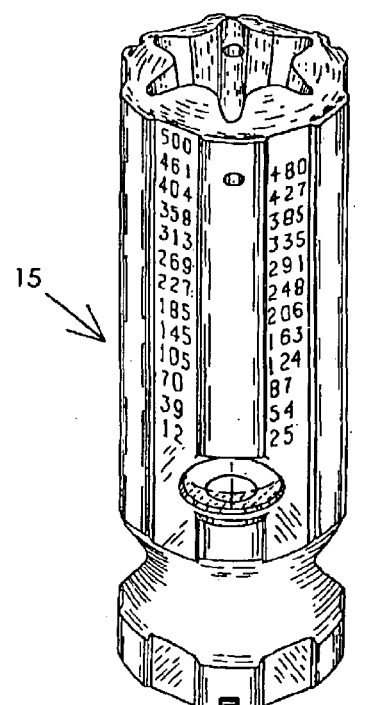
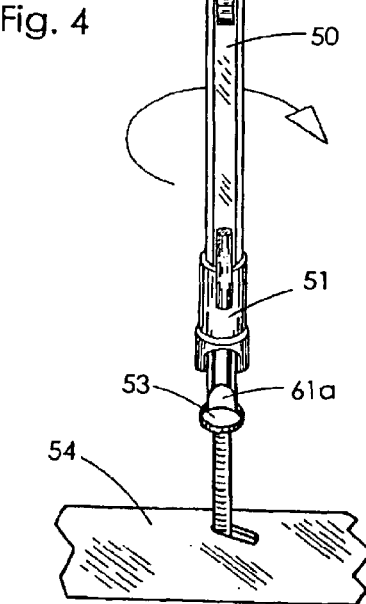
Fig. 3
Fig. 4

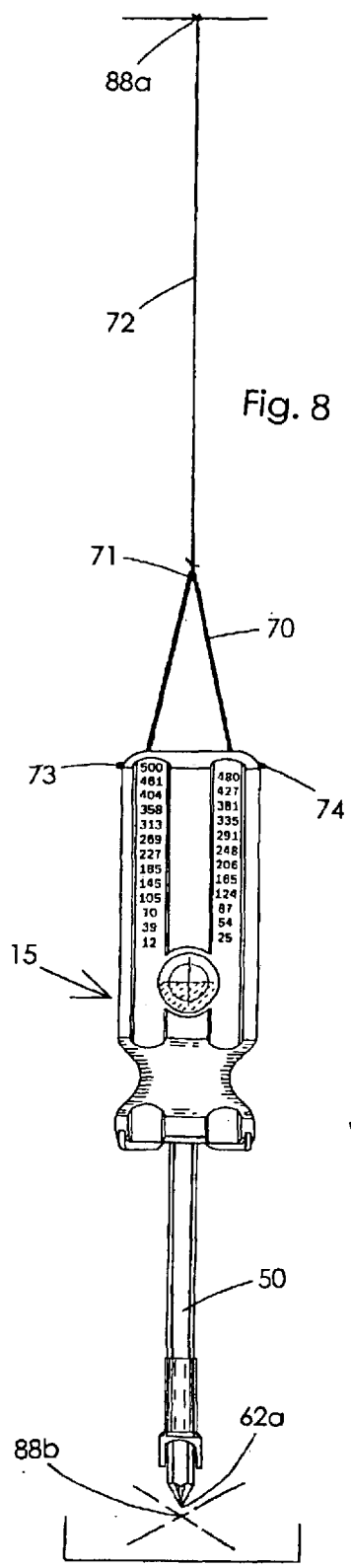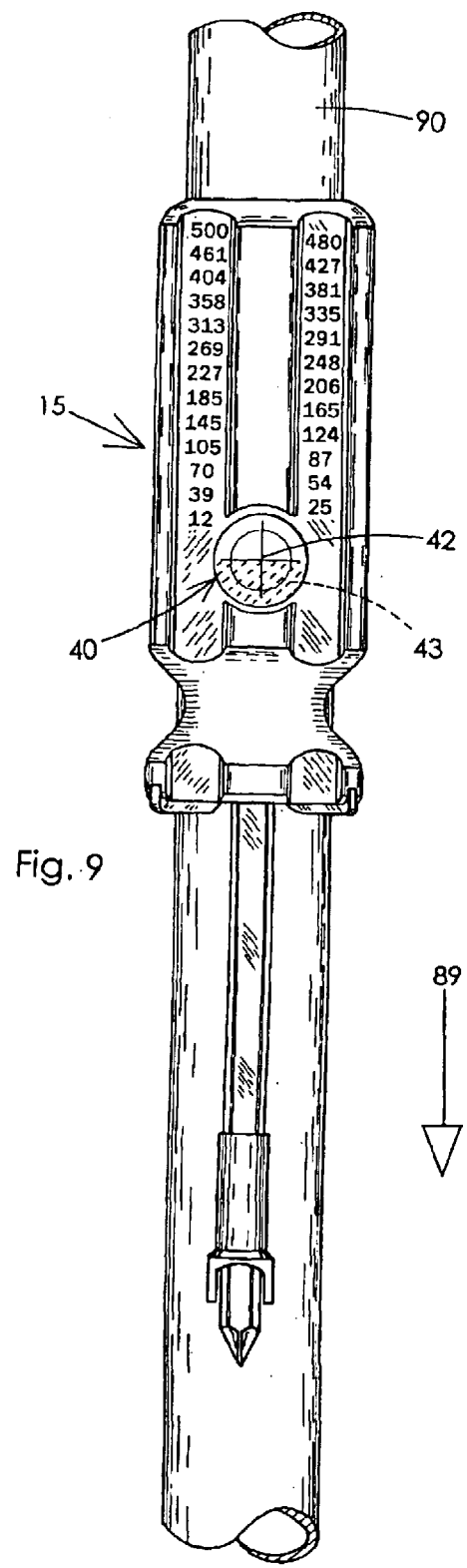

HANDLE MULTI-PURPOSE TOOL

CROSS-REFERENCE TO RELATED APPLICATIONS

Not applicable.

BACKGROUND-FIELD OF THE INVENTION

The present invention relates to multi-purpose hand tools of the particular type utilized by electricians. More specifically, it relates to the tools which electricians keep in their pouch.

BACKGROUND-DESCRIPTION OF PRIOR ART

The prior arts are well documented with pliers, screwdrivers, level wire nut drivers and many other kinds of well-known tools. Such tools are particularly useful to electricians who desire the capabilities of portable and compact multi-function tools to perform their tasks. This is even more important because of the fact that electricians must often work in fairly inaccessible locations, making the practicality of carrying numerous tools in their pouch often difficult or impossible.

Examples of aforementioned well-known tools are as follows:

A pair of pliers is particularly useful for gripping wire terminals for splicing before wire nuts are connected.

A wire nut driver is particularly useful to screw the nut onto the end of wires to prevent an electrician's fingers from becoming tender and sore. Examples of wire nut drivers are illustrated in U.S Pat. No. 3,769,862 November/73 to Miller or US 2002/069715 A1 to Genco.

A plumb bob is generally useful to get a true vertical-line when fixtures or posts are installed.

A level generally is useful when electrical paneling, gutters, conduits, lamps, or electrical boxes are fixed.

A measuring tape and a calculator is particularly useful to determine how many feet of wound wire remain on a reel.

A multi-tip screwdriver is generally useful for fixing screws on electrical boxes, connectors, paneling, etc.

A channel lock pliers or a file is particularly used to smooth burrs produced by a saw when an electrical conduit section is cut.

A needle nose pliers is generally useful to bend stripped wire terminals, which are often connected with a "U", or "O"-form at their ends.

A particular non-slip screwdriver is used at angled positions in which a screwdriver cannot be aligned with the screw axis.

A lever is used to align or remove parts fastened to walls.

Accordingly, it is a principal objective of the present invention to provide a multi-purpose hand tool, which is able to perform the mentioned functions using just the subject matter of this invention.

SUMMARY OF THE INVENTION

In its broadest description, this invention describes a multi-purpose hand tool comprising:

A handle body which includes a cavity recessed from the upper end thereof, said cavity being of generally tapered section having open interior side walls, extending from said open end through half of said cavity, forming a socket next to the open end, sized to receive any of the most common sizes of wire nuts. A metallic insert extends inward from the interior side walls of said socket towards the bottom of said cavity, forming a second socket, sized to receive the most common gages of stripped electrical wire passed endwise through said first socket and into said second socket. Three pairs of grooves are formed in said interior side walls on opposite sides of said first socket, sized to receive the protruding wings of wire nuts. Three slots at the bottom of said metallic insert form a "Y"-end, sized to receive said stripped wire.

A hole pierces the upper end of the handle transversally, crossing trhough said first socket on a cross-section, is sized to receive both ends of a flexible "V"-form hook.

Various numerical columns are engraved and/or painted on the generally cylindrical exterior area of the handle extending coaxially downward from the upper end of said exterior area.

The exterior area of said handle is bored out to receive an embedded level instrument, which includes a liquid substance, an air bubble, and a target point, so that said handle can be used as a level.

Two pairs of magnets are inserted in the exterior area of said handle, transverse to said target point, proximate to both ends on a coaxial plane and parallel to the target point plane, in such a way that the handle can adhere to an iron surface.

An elongated metallic bar is connected to the center of the cross section of the lower end of said handle body, extending coaxially outward, with a tip receiver connected to the other end of said bar, enabling various kinds of tip drivers to be utilized.

Three steel wires connected on the bottom of the handle-body enable said handle to be used as a scraper.

BRIEF DESCRIPTION OF THE SEVERAL VIEWS OF THE DRAWINGS.

FIG. 1A is a cross-sectional view of FIG. 1.

FIG. 1B is a cross-sectional view from FIG. 1, taken along line B, showing the holes for plumb bob function, the wire nut socket, and wire twister area.

FIG. 1C is a cross-sectional view from FIG. 1, taken along line C, showing the wire twister area and a pair of magnets.

FIG. 1D is a cross-sectional view from FIG. 1, taken along line D, showing the bayonet area and parts for performing as a scraper tool.

FIG. 1T is an elevation view of the screwdriver tips.

FIG. 3 shows a perspective view of the preferred embodiment, performing as a loop maker.

FIG. 4 is a perspective view of the preferred embodiment; performing as a multi-tip screwdriver, fastening a screw.

FIG. 8 is an elevation illustration, showing how the tool may be connected to a hook and hung by a chord, to be used as a plumb bob.

FIG. 9 is an elevation illustration, showing the tool stuck to a steel pipe by the magnets (no shown).

Figure 1:
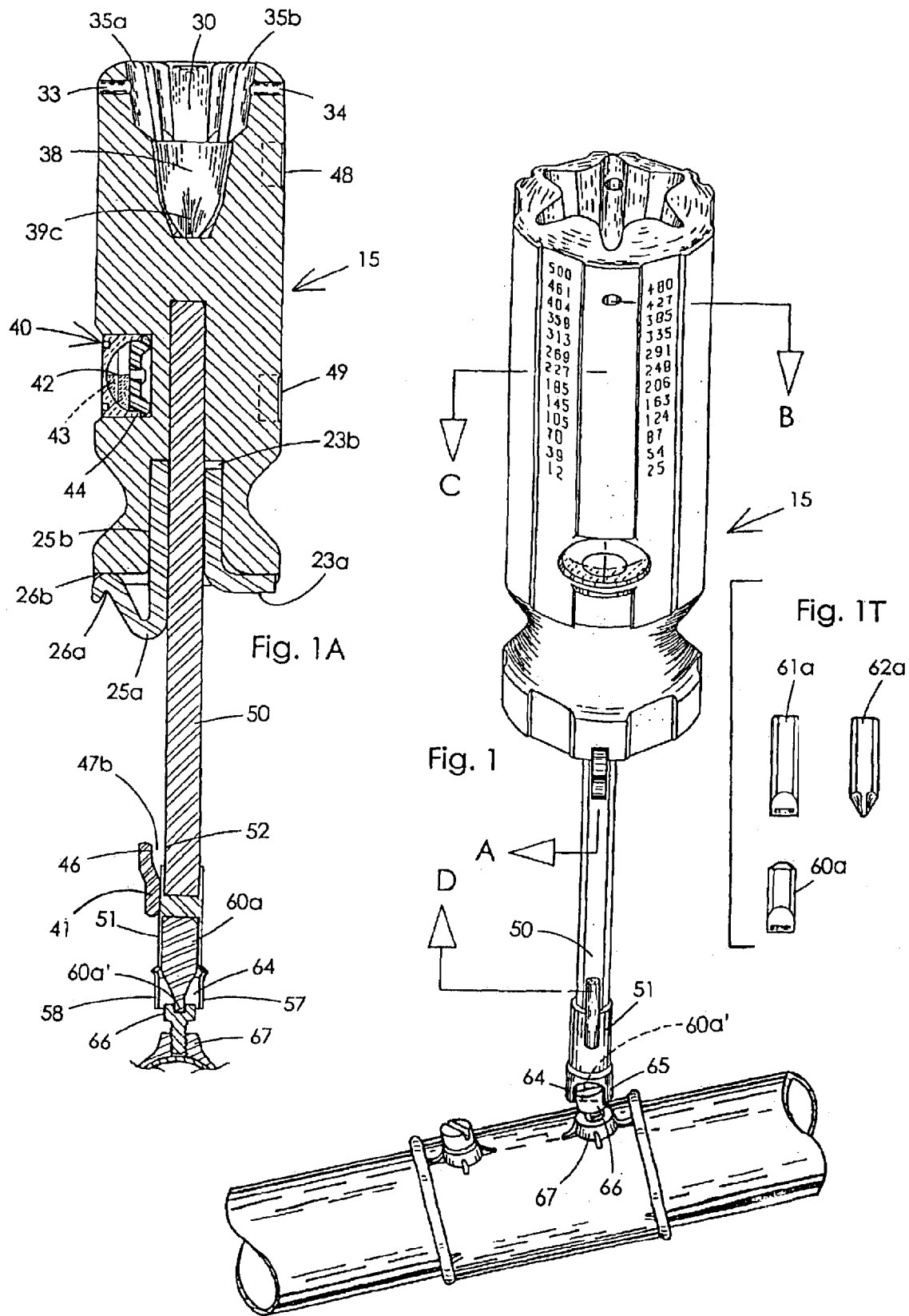
FIG. 1 is a perspective illustration, showing how the tool may be used as a non-slip screwdriver to fasten a screw at a coupling.

| Reference Numerals in Drawings | | | |
|---|---|---|---|
| 15 | Handle multi-purpose tool | 17 | Terminal wire-stripped |
| 18 | Terminal wire-stripped | 19 | Wire |
| 23a | "L"-form steel wire | 23b | Cavity for "L"-form steel wire |
| 24a | "L"-form steel wire | 24b | Cavity for "L"-form steel wire |
| 25a | "J"-form steel wire | 25b | Cavity for "J"-form steel wire |
| 26a | Loop for burr removal | 26b | Groove for loop of "J"-form steel wire |
| 27 | Filing, burrs | 28 | Electric conduit |
| 29 | Electric conduit cross section edge | 30 | Wire nut socket |
| 31 | Loop | 33 | Bore for "V"-form hook |
| 34 | Bore for "V" form hook | 35a | Groove of socket wire nut receiver |
| 35b | Groove of socket wire nut receiver | 36a | Groove of socket wire nut receiver |
| 36b | Groove of socket wire nut receiver | 37a | Groove of socket wire nut receiver |
| 37b | Groove of socket wire nut receiver | 38 | Metallic insert |
| 39a | Slot at the end of metal insert | 39b | Slot at the end of metal insert |
| 39c | Slot in end of metal insert | 39y | Slot base of "Y"-form |
| 40 | Level instrument | 41 | Bayonet |
| 42 | Target point | 43 | Liquid of level instrument |
| 44 | Cavity for instrument level | 45 | Wire |
| 46 | Bayonet free end | 47a | Terminal wire between bar and bayonet |
| 47b | Space to set stripped wire terminal | 48 | Magnets |
| 49 | Magnets | 50 | Bar |
| 51 | Tip receiver | 52 | Bar section for holding wire terminal |
| 53 | Slotted screw head | 54 | Surface to be fastened |
| 55 | Conduit Section | 56 | Bar section in contact with conduit |
| 57 | Notch at tip receiver extension | 58 | Notch at tip receiver extension |
| 60a | Short Flat tip | 60a' | Flat section of short tip |
| 61a | Flat tip | 61b | Tip holder |
| 62a | Phillips tip | 62b | Tip holder |
| 63 | Pivot point | 64 | Extension walls |
| 65 | Extension walls | 66 | Screw head |
| 67 | Coupling nut | 69 | Groove to accommodate forefinger |
| 70 | Hook | 71 | Hook angle |
| 72 | Cord | 73 | Hook end |
| 74 | Hook end | 77 | Pivot point |
| 78 | Wall section | 79 | Conduit strap |
| 82 | Numerical column | 83 | Reel edge |
| 84 | Reel of #14 THWN wire | 85 | Wire wound on reel |
| 86 | Wire gage indicator | 88a | Reference point |
| 88b | Floor mark | 89 | Gravity force direction |
| 92 | Spliced wires | 94 | Wire nut |
| 95a | Wire nut wing | 95b | Wire nut wing |
| 97 | Elastic band | 98 | Cavity for band |
| 99a | Fingertip | 99b | Tip holder upper end |

| Reference Numerals in Drawings | | | |
|---|---|---|---|
| 101 | Plumb bob | 102 | Lever |
| 103 | Multi tip screwdriver | 104 | Wire nut tool |
| 105 | Pliers | 106 | Needle nose pliers |
| 107 | Channel lock | 108 | Measurement tape and calculator |
| 109 | Non-slip screwdriver | 110 | Level |

DETAILED DESCRIPTION OF THE PREFERRED EMBODIMENT

The preferred embodiment of the present invention is a multi-purpose hand tool, integrally formed with an elongated body. Its generally cylindrical cross-section is composed of a substantially plastic or artificial resin material and comprises a handle body generally designated by the numeral 15 FIG. 1, having a fixed bar 50 at the center of its lower end. Said bar 50 includes a tip receiver 51 at its free end to which various kinds of tips 60a, 61a and 62a FIG. 1T can be coupled. Said tip receiver 51 includes a particular cylindrical form extension 64, 65 FIGS. 1 and 1A which is slightly wider than the tip receiver and is suitable to hide the flat section 60a' of the said shorter particular tip 60a. Said extension includes two "U"-form notches 57, 58 to provide access to said shorter tip 60a as it is shown in FIGS. 1, 1A; said tip receiver 51 and tips 60a, 61a and 62a, obviously, become the preferred embodiment 15, a multi-tip screwdriver, shown in FIG. 4, with, the ability of fastening a screw head 53 to a surface 54, as does the multi-tip screwdriver shown in 103 FIG. 13.

The shorter particular tip 60a FIGS. 1 and 1A is able to perform at a particularly awkward angle, at which a common screwdriver would slide, because it isn't aligned with the screw axis. FIG. 1 and 1A show how the flat section 60a' of said shorter tip 60a stays in place, even though the axis of the screw 66 and coupling nut 67 are not aligned with the tip's axis, as does a non-slip screwdriver 109 of FIG. 13.

Figure 13:
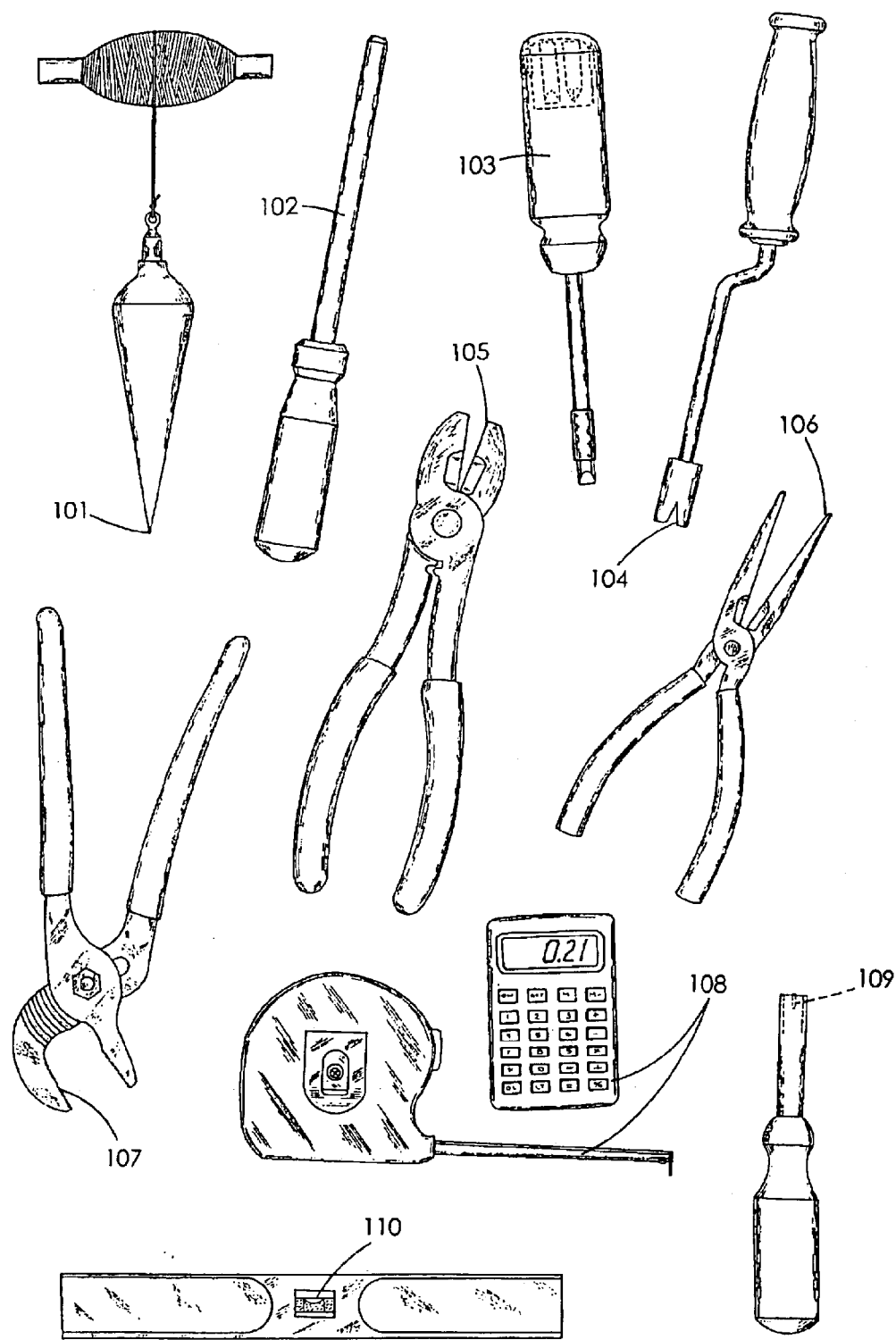
FIG. 13 is an elevation illustration of all the different prior art tools for which the present invention could totally or partially substitute.

The multi-purpose tool 15 shows in FIGS. 1A, 1B a cross-section of cavity 30, recessed from the upper end thereof, having upper interior sidewalls which include three pairs of grooves 35a, 35b; 36a, 36b and 37a, 37b formed in the handle material itself, equally spaced, extending from said open end to half the depth of said cavity 30, forming a socket/wire nut receiver, proximate said open end, sized to receive the protruding wings of any of the most common sizes of wire nuts, as does wire nut driver tool 104 FIG. 13.

Figure 6:
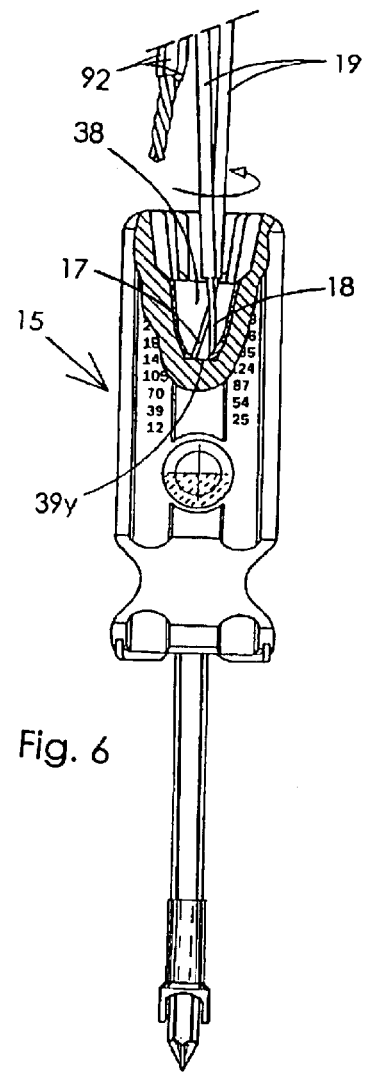
FIG. 6 is a front view illustration, showing how the tool may be used to splice electrical wire terminals.
Figure 10:
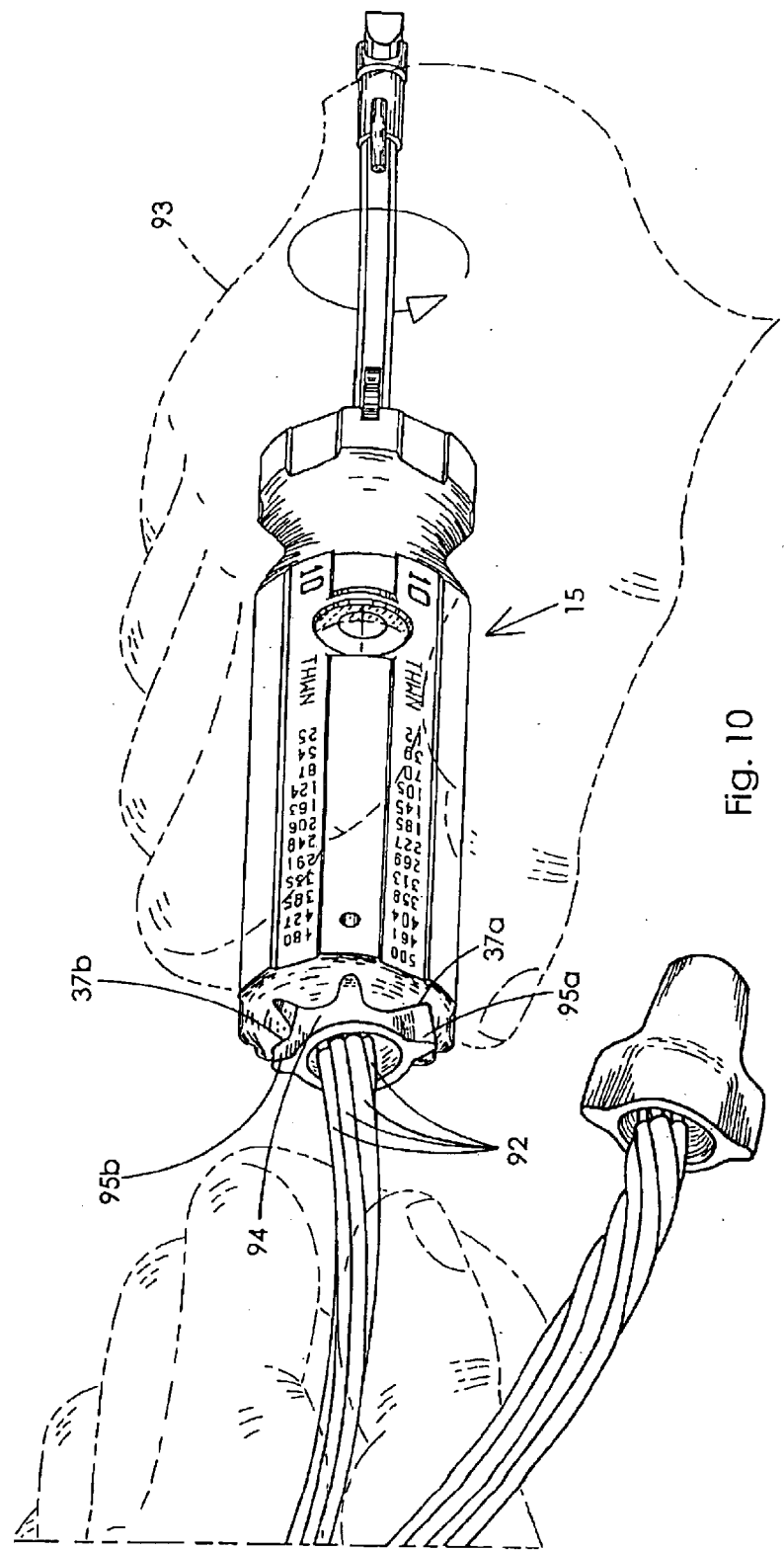
FIG. 10 is a perspective illustration, showing how the tool may be used as a wire nut driver.

A metallic insert 38 in the lower half of said cavity 30, extending from the upper interior sidewalls downward, forming an interior portion consisting of a metallic socket 38 which includes three slots 39a, 39b and 39c, all of which are slightly wider than one stripped #12 wire and narrower than two stripped #14 wires, said slots being 120° apart, in the shape of a"Y"-form base 39y. Said insert 38 is shown at FIGS. 1A, 1C and 6; said metallic insert socket 38 is sized to receive the most common gages of stripped electrical wire ends 17, 18, passed endwise through said first socket 30 and into said socket 38. The wires 19 to be connected are passed endwise through the first socket into the second socket. The handle 15 is rotated and the stripped wires 19 are spliced as it is shown in FIG. 6, as do pliers 105 FIG. 13. Then, spliced wires 92 are passed into the wire nut 94, as shown in FIG. 10. The open end of the first socket is passed over the nut and the handle is slightly rotated until the nut's wings, 95a and 95b, pass into grooves 37a and 37b. The nut 94 is screwed into place on the wires by rotating the handle, which applies substantial torque to complete the work when it is rotated by hand 93, as does wire nut driver 104 FIG. 13.

Holes 33, 34 transversally pierce the upper end of handle 15. Said holes 33, 34 cross through the first cavity 30 FIGS. 1A, 1B on one cross-sectional line and are suitable to receive a "V"-form flexible hook. The "U"-form hook 70 is made of flexible steel wire, so that both ends 73, 74 close when it is compressed by hand. It returns to its open position when pressure is released. Thus, the "U"-form hook 70 is coupled in place by passing the hook ends 73, 74 into holes 33, 34 from the inside to the outside, via cavity 30. Thus, when the cord 72 is connected at angle 71 of the "U"-form hook 70 and it is hung at the reference point 88a, as it is shown in FIG. 8, the multi-purpose tool is suitable to be used to compare the parallelism with gravity force direction 89 and the floor mark 88b, as does a plumb bob 101 FIG. 13.

Figure 7:
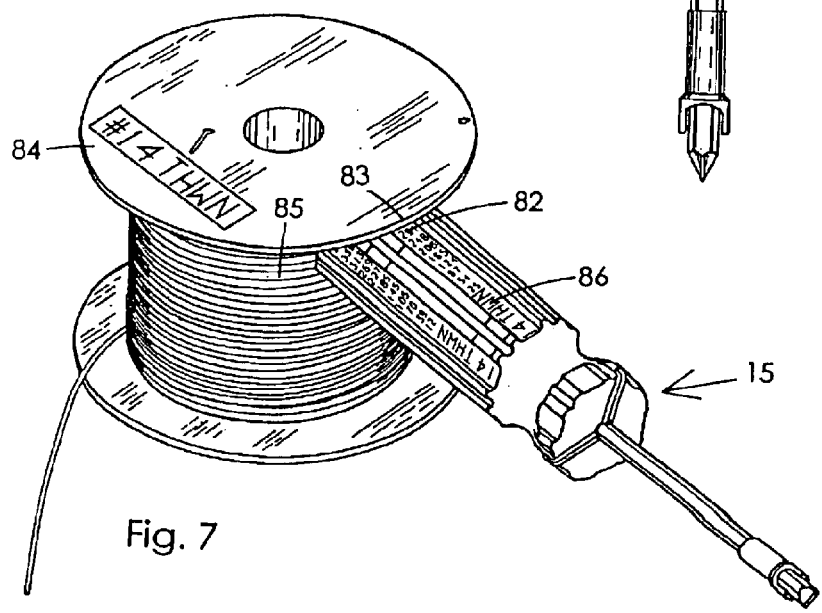
FIG. 7 is a perspective illustration, showing how the tool may be used to determine what length of wound wire remains on a reel.

Various numerical columns, engraved and/or painted on the generally cylindrical exterior area of the handle 15, extend coaxially downward from the upper end of said exterior area. As it can be seen in FIG. 7, the handle body 15 is placed in such a way that the upper end abuts into the wound wire 85 on the reel 84. Then, it is possible to read the numeral in the column 82 which corresponds to the reel edge 83, to determine the amount of wound wire 85 remaining on a reel 84, as does a measurement tape and calculator 108, shown in FIG. 13. Notice that the wire gage number and insulation type 86 are near the numerical columns.

FIG. 1A shows a circular cavity 44 in the exterior area of the handle body 15, wherein a sealed container 40 is embedded, said container 40 made of a transparent material and including a liquid substance 43 and an air bubble therein, as well as a target point 42 traced on the exterior area of said transparent container 40. Thus, the preferred embodiment of the present invention could be placed in such position that the target point 42 could be used to compare the horizontality with gravity force direction 89, as shown in FIG. 9, as does a level 110 FIG. 13.

Two pairs of magnets 48, 49 are embedded at the exterior area of handle body 15. Both of said magnet pairs 48, 49 are placed on the same plane, diametrical and parallel to the target point 42 plane, as it is shown in FIG. 1A. Said two pairs of magnets 48, 49 enable the handle body 15 to adhere to any iron surface, so that the target point 42 can be observed as shown in FIG. 9. Thus, the preferred embodiment of the present invention may be used as a magnetic level 110, as shown in FIG. 13.

Three "L"-form cavities 23b, 24b y 25b, 26b, are separated by 120° at the lower, end of the handle 15, of which the shorter sides are grooves extending as three radius from the exterior edge to the center and continuing coaxially inward as three flanges proximate and perpendicular to the bar 50, as it is clearly shown in FIGS. 1A, 1D.

Figure 2:
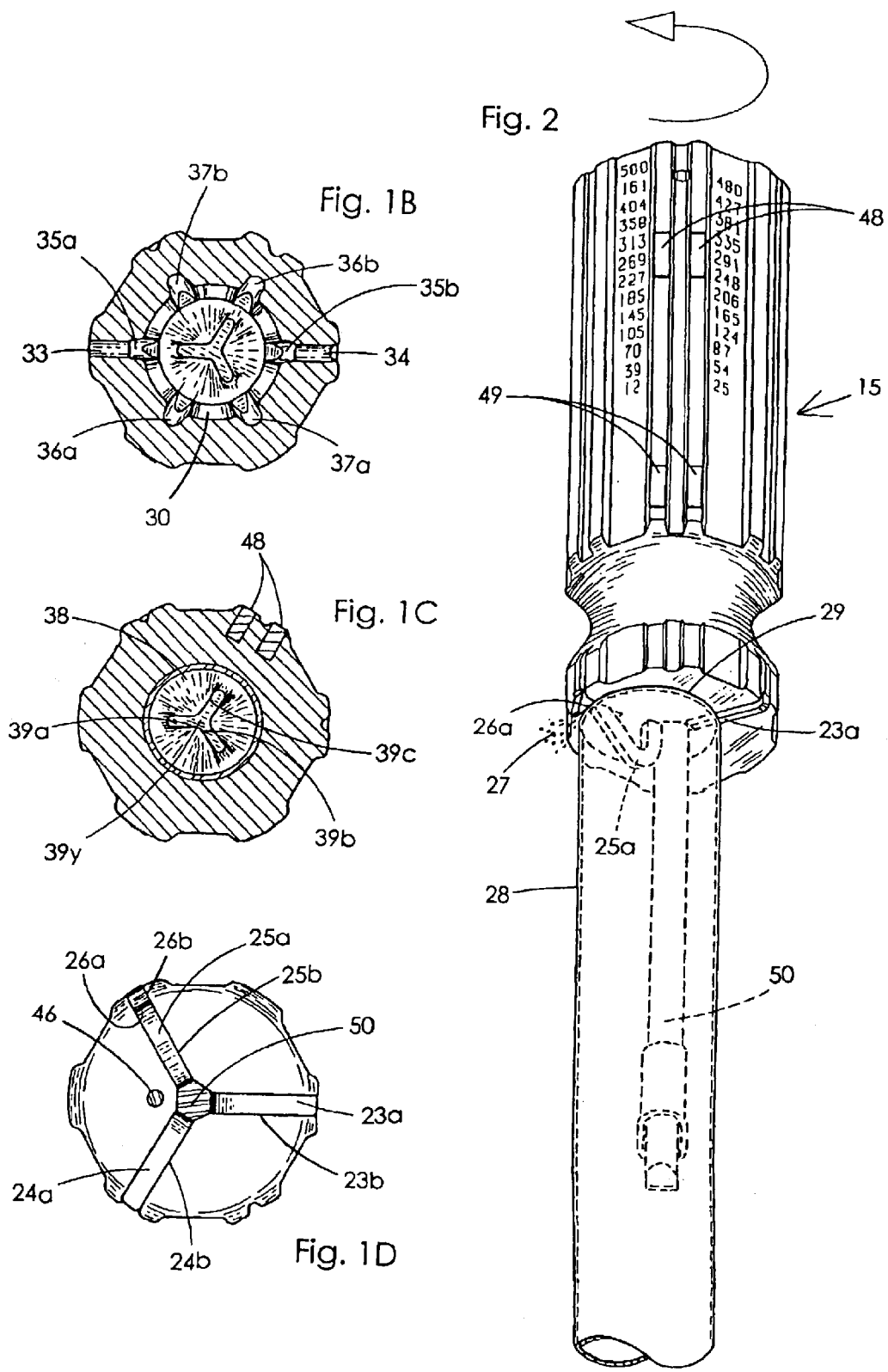
FIG. 2 is a perspective illustration of the preferred embodiment, showing how the tool may be used as a scraper to remove burrs from an electrical conduit.

Two "L"-form steel wires 23a, 24a are embedded in said "L"-form cavities 23b, 24b and a "J"-form steel wire 25a is embedded in said "L"-form cavity 25b, 26b. Notice that said "J"-form steel wire includes a loop at its free end. In FIG. 2, it clearly shows the preferred embodiment 15 can perform as a scraper to remove burrs 27 from the edge 29 of a cut piece of electrical conduit 28 by rotating the handle body 15, as commonly do electricians, using channel locks 107 of FIG. 13. Notice that the loop 26a performs to remove burrs 27 inside and outside of conduit 28.

FIGS. 1A, 1D and 3, show a bayonet form steel wire 41 of circular cross-section connected to the upper end of the tip receiver 51, extending upward and having a free end 46 which is apart from bar 50. Said free end 46 is suitable to make any kind of loop 31, even a closed "0" form loop 47a on a stripped wire terminal 45, by setting it on the space 47b between the bar section 52 and the bayonet offset 46 and rotating the handle body 15, as shown in FIG. 3. Thus, the preferred embodiment performs as a needle-nose pliers 106, FIG. 13.

Figure 5:
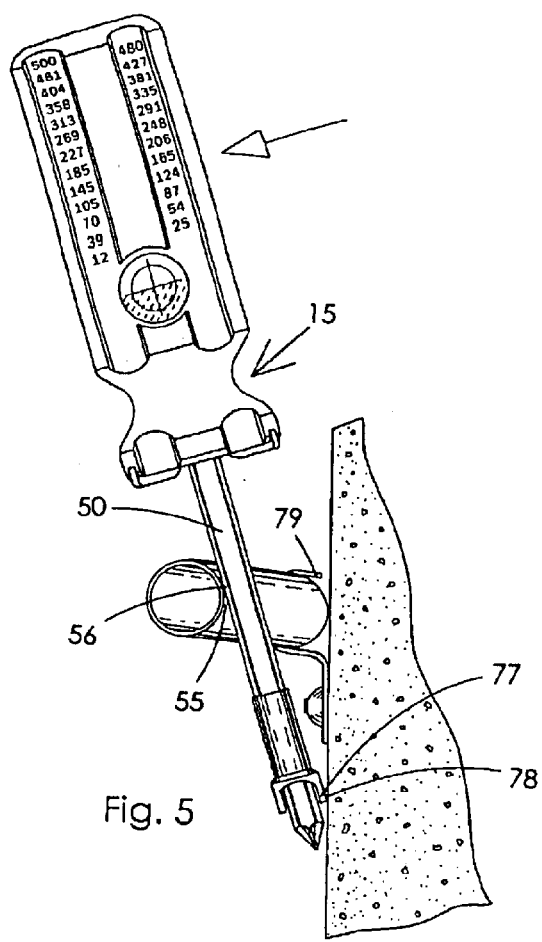
FIG. 5 is a perspective illustration showing how the tool may be used as a lever, removing an electrical conduit from a wall.

FIG. 5 shows that the preferred embodiment may be used as a lever to align or remove electrical conduit 55 or the like affixed to a wall 78. By setting the end of the bar 50 between an affixed electrical conduit 55 and the wall 78, and pulling the handle body 15 so that the bar 50 pivots at its free end 77, the bar 56 puts pressure on the conduit 55 and strap 79. Thus, the preferred embodiment performs as the lever shown 102 in FIG. 13.

Additional Embodiment

Figure 11A:
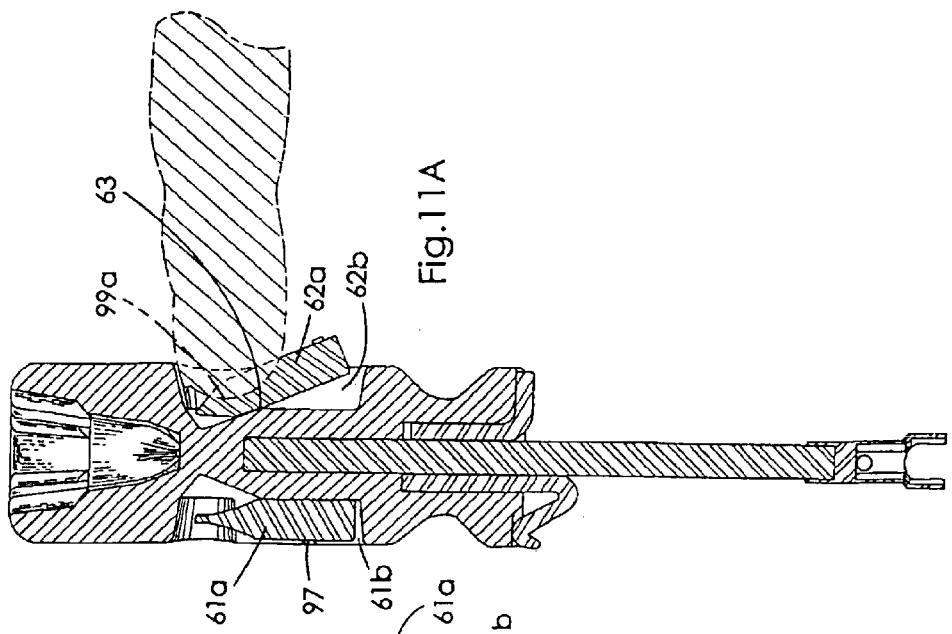
FIG. 11A is a cross-section of FIG. 11.
Figure 11:
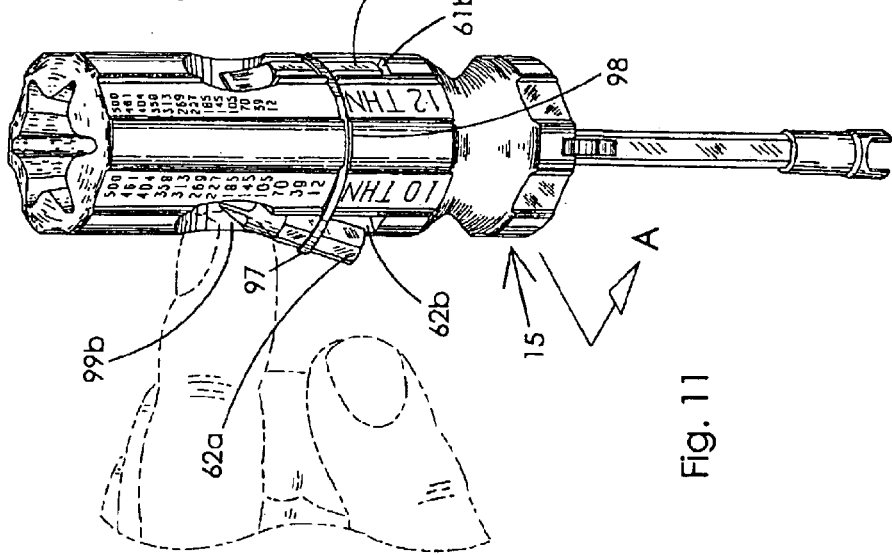
FIG. 11 is a perspective illustration of the preferred embodiment carrying the tips therewith, showing a fingertip pushing a tip to take it out.

Additional embodiment is shown in FIGS. 11 and 11A. In this case, the hand tool 15 includes various additional elongated cavities 61b, 62b. An elastic band 97 is placed in a groove 98 encircling said elongated cavities 61b, 62b, which are designed to keep a set of tips 61a, 62a integrated with said hand tool 15 therein. Said elongated cavities 61b, 62b are positioned in the exterior area all around the hand tool 15, extending coaxially about mid-length; along the handle body 15, each cavity 61b and 62b alternating with an open strip alongside. Said cavities are slightly wider at the top, including a circular form 99b. Both the ramp form 63 and the wider upper end 99b of said cavities allow that a tip 62a pivots when it is pushed by a fingertip 99a, in order to remove tips.

Alternative Embodiment

Figure 12:
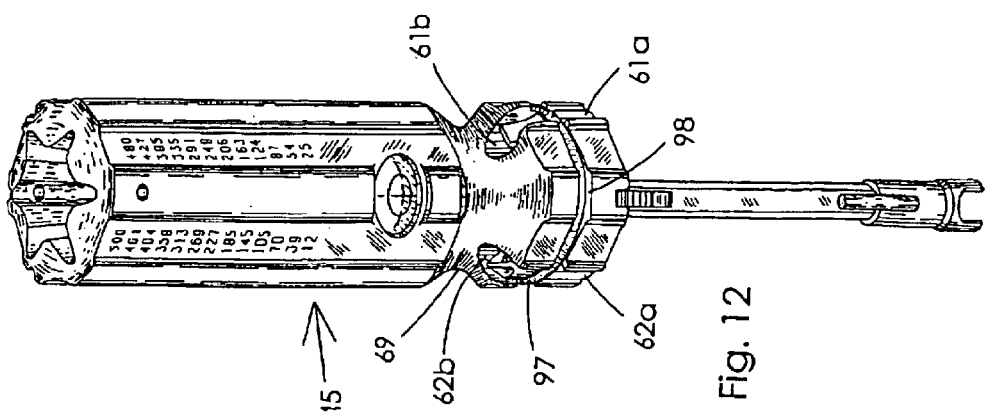
FIG. 12 is a perspective illustration of the preferred embodiment carrying the tips therewith.

There is another different possibility with regard to the position of the cavities 61b, 62b to keep a set of tips 61a, 62a integrated with the hand tool 15, as illustrated in FIG. 12, which shows said cavities 61b, 62b positioned around the lower end of said hand tool 15. An elastic baud 97 is placed in a groove 98, which encircles said elongated cavities 61b, 62b (including an open strips between cavities and two open ends to provide withdrawal of said tips 61a, 62a, either upward or downward by an open end at the bottom or downward by pushing with a fingertip at the upper end of said cavity) and is accessible by the groove 69 around hand tool 15.

Advantages:

From the description above, a number of advantages of my handle tool become evident:

A lesser amount of artificial resin or plastic is used to manufacture it.

Substitute partially or totally the functions of the ten aforementioned prior arts.

A drastic reduction in the tool pouch weight.

No moving parts are needed to perform its several functions.

A durable multi-function hand tool.

A greater performance and productivity of the operator.

It is easier to set the wire nut in the socket than in prior arts.

The manufacturing cost is less than some of the prior art for which my invention substitutes.

Easily identifialble by touch.

I claim:

1. A multi-purpose tool comprising;
   a) a handle body including
   b) a generally tapered cavity at the upper end of said handle body, extending coaxially inward, having an open end and interior sidewalls, said sidewalls having various spaced pairs of grooves forming a socket wire nut drive, sized to receive the most frequently used wire nut sizes;

c) a metallic insert fixed in the innermost section of said tapered cavity, said insert having an open end at the top and various slots at the bottom, said slots being slightly wider than a cross-section of one #12 stripped wire, and slightly narrower than a cross-section of two #14 stripped wires together, enabling wire insertion in order to align and twist various stripped terminal wires #12 and #14;

d) a cavity in the exterior area of said handle body and a level instrument embedded in said cavity, and a means to adhere said handle body to any ferrometallic surface, said means to adhere fixed on the opposite plane from said level instrument target point plane;

e) various columns of characters on the surface alongside of said handle body, said characters are closely related to the amount of wound wire on a reel, each column of characters also having an identifying mark related to wires' and reels' specific characteristics;

f) a pair of holes diametrically piercing said tapered cavity closely to the upper end said handle body sized to receive both ends of a flexible "V" form cord-hook passed endwise through said tapered cavity, a bar fixed at the center of the lower end of said handle body, said bar includes a tip receiver and a phillips tip set in said tip receiver;

g) two metallic "L" form inserts and one "J" form insert, all of the letter forms insert aproximatly 120° from each other, are embedded at the lower end of said handle body, the longer sides of said three inserts extending coaxially inward close to said bar, the shorter sides of said letter form inserts extending radially from the center to the periphery of said handle body, the shorter sides of said two inserts set semi-embedded in the lower face of said handle body, said "J" form insert includes an inverted "V" form at its exposed end;

h) said bar being of a rigid material;

i) a bayonet form attached close to the lower end of said bar, said bayonet having a free end extending parallel and close to said bar;

j) said tip receiver having an extension which is wider than said tip receiver, said extension includes two "U" form notches which provide purchase to fingers for removing or setting a particular shorter flat tip, whose flat section does not overhang said extension edge, whereby, said structure performs partially or totally as a group of existing prior arts does; a wire nut driver, a pliers, a level, a plum bob, a measurement tape with a calculator, a multi-tip screwdriver, a channel lock, a lever, a needle nose pliers, and a non-slip screwdriver, providing an overall increase in working speed and a great reduction of the weight and size of a tool pouch, as well a reduction of manufacturing costs.

2. The multi-purpose tool defined in claim 1 wherein said handle body includes elongated cavities encircling said handle body, said cavities having an end slightly wider than the other end and a ramp on the bottom extending from the center of said cavity, also, a groove surrounding said cavities about mid-length, said cavities each store a tip which pivots when a fingertip pushes it to be removed from said cavity.

3. The multi-purpose tool defined in claim 1 wherein said handle body includes an extended protuberance at its lower end, said protuberance having multiple open strips alongside, encircling said protuberance, at about the mid-length of said open strips, there is a low-protuberance groove with an elastic means which holds each tip within said open strip.

* * * * *

UNITED STATES PATENT AND TRADEMARK OFFICE
CERTIFICATE OF CORRECTION

| | |
|---|---|
| PATENT NO. | : 7,051,392 B2 |
| APPLICATION NO. | : 10/697134 |
| DATED | : March 21, 2006 |
| INVENTOR(S) | : Armando Dominguez |

It is certified that error appears in the above-identified patent and that said Letters Patent is hereby corrected as shown below:

On the title page (75) Inventors: delete the address and insert therefor
--11335 S.W. 32nd Street, Miami FL 33165--

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,051,392 B2 | Page 1 of 1 |
| APPLICATION NO. | : 10/697134 | |
| DATED | : May 30, 2006 | |
| INVENTOR(S) | : Armando Dominguez | |

It is certified that error appears in the above-identified patent and that said Letters Patent is hereby corrected as shown below:

On the title page (75) Inventors: delete the address and insert therefor
--11335 S.W. 32nd Street, Miami  FL  33165--

This certificate supersedes the Certificate of Correction issued October 21, 2008.

Signed and Sealed this

Eleventh Day of November, 2008

JON W. DUDAS
*Director of the United States Patent and Trademark Office*